(12) United States Patent
Resare et al.

(10) Patent No.: US 9,566,824 B2
(45) Date of Patent: Feb. 14, 2017

(54) DUAL TIRE SHIELD AND RUNFLAT

(71) Applicants: Lars Johan Resare, Ewing, NJ (US); Brian T. Graham, Succasunna, NJ (US); Charles Tabone, Grand Island, NY (US); Larry K. Rogers, Georgetown, KY (US); Ian N. Bakst, Morganville, NJ (US)

(72) Inventors: Lars Johan Resare, Ewing, NJ (US); Brian T. Graham, Succasunna, NJ (US); Charles Tabone, Grand Island, NY (US); Larry K. Rogers, Georgetown, KY (US); Ian N. Bakst, Morganville, NJ (US)

(73) Assignee: Hutchinson, SA, Paris (FR)

( * ) Notice: Subject to any disclaimer, the term of this patent is extended or adjusted under 35 U.S.C. 154(b) by 18 days.

(21) Appl. No.: 14/387,866

(22) PCT Filed: Aug. 13, 2013

(86) PCT No.: PCT/US2013/054799
§ 371 (c)(1),
(2) Date: Sep. 25, 2014

(87) PCT Pub. No.: WO2014/028539
PCT Pub. Date: Feb. 20, 2014

(65) Prior Publication Data
US 2015/0042148 A1    Feb. 12, 2015

(51) Int. Cl.
*B60B 11/00* (2006.01)
*B60B 7/02* (2006.01)
(Continued)

(52) U.S. Cl.
CPC .................. *B60B 7/02* (2013.01); *B60B 11/00* (2013.01); *B60B 11/10* (2013.01); *B60C 11/22* (2013.01);
(Continued)

(58) Field of Classification Search
CPC ............ B60B 7/02; B60B 11/00; B60B 11/04; B60B 11/06; B60B 11/10; B60C 11/22; B60C 13/002
(Continued)

(56) References Cited

U.S. PATENT DOCUMENTS 2,356,292 A * 8/1944 Wildman .................. B60S 1/68
                                                280/856
2,397,741 A * 4/1946 Jordan, Jr. .............. B60B 11/06
                                                301/36.1
(Continued)

FOREIGN PATENT DOCUMENTS

CN          2905512 Y   *  5/2007

OTHER PUBLICATIONS

Mechanical translation of CN2905512Y, Huang, May 30, 2007.*

*Primary Examiner* — John Walters
(74) *Attorney, Agent, or Firm* — Steven R. Scott

(57) ABSTRACT

The Dual Tire Shield of the invention mounts between dual tires and helps to prevent debris from getting into the gap between dual tires and/or damaging the tires when it does so. In some embodiments it can also serve as a runflat for dual tires. Debris can become wedged between the sidewalls of dual tires that face each other, or "inner sidewalls" of such tires. The dual tire shield prevents debris from getting stuck between the inner sidewalls of the dual tires and thereby prevents flats caused by sidewall puncture or bead de-seating due to such debris. The device accomplishes this by: Blocking debris from entering the gap between duals and/or
(Continued)

Figure 1:
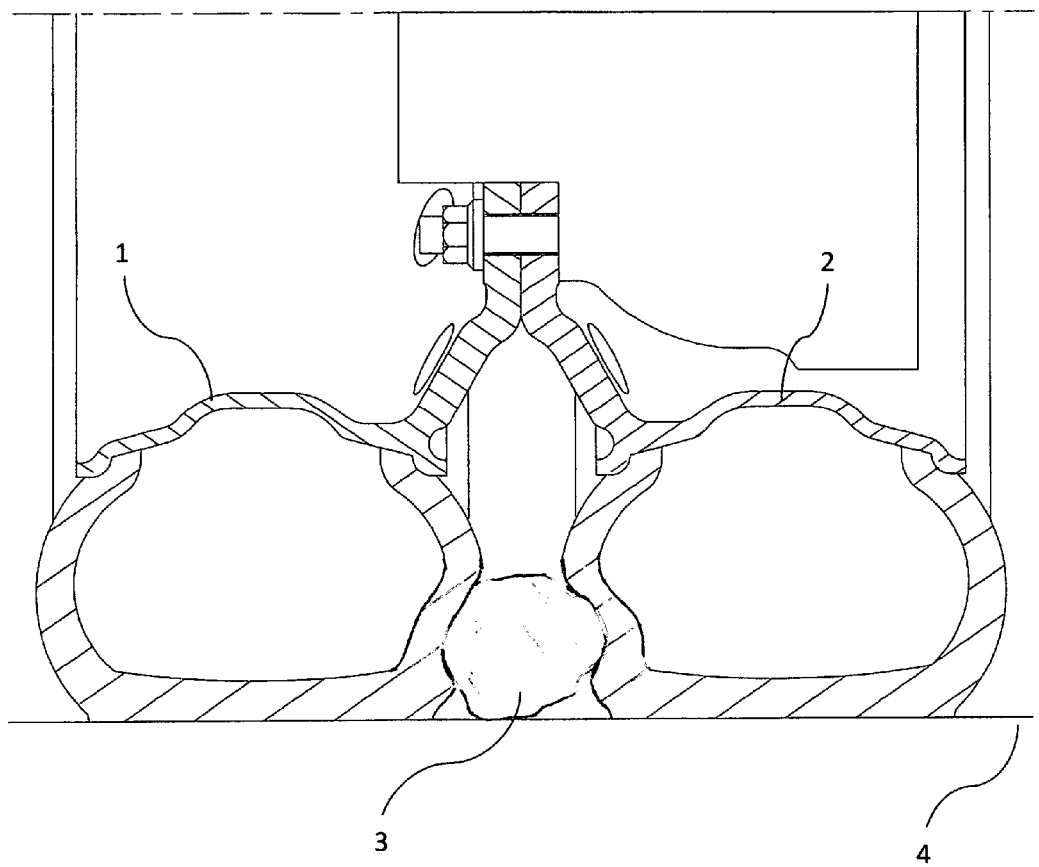

prevent debris from being wedged in the gap; keeping such debris from contact with one or both of the tires even if wedged therebetween; and/or ejecting debris from between the tires. Further, the dual tire shield may be made rigid enough and/or include rigid portions so as to act as a runflat in case a tire goes flat regardless of the reason.

16 Claims, 11 Drawing Sheets

(51) Int. Cl.
*B60C 11/22* (2006.01)
*B60C 13/00* (2006.01)
*B60B 11/10* (2006.01)

(52) U.S. Cl.
CPC ........ *B60C 13/002* (2013.04); *B60B 2900/212* (2013.01)

(58) Field of Classification Search
USPC ............... 301/36.1, 36.3, 38.1; 280/855, 856
See application file for complete search history.

(56) References Cited

U.S. PATENT DOCUMENTS

| | | | | | |
|---|---|---|---|---|---|
| 3,913,943 | A | * | 10/1975 | Tamburino | B60S 1/68 280/856 |
| 4,613,145 | A | * | 9/1986 | Greff, Sr. | B60S 1/68 280/855 |
| 5,271,665 | A | * | 12/1993 | O'Coin | B60B 11/06 301/36.3 |

* cited by examiner

DUAL TIRE SHIELD AND RUNFLAT

CROSS-REFERENCE TO RELATED APPLICATIONS

This application claims an invention which was disclosed in a provisional application filed Aug. 13, 2012, Ser. No. 61/682,434, entitled "Dual Tire Shield and Runflat". The benefit under 35 USC §119(e) of the U.S. provisional application is hereby claimed, and the aforementioned application is hereby incorporated herein by reference.

BACKGROUND

This invention pertains generally to the field of devices used to protect the sidewalls of tires from cuts, punctures, etc. Previous tire shield devices were placed on the outwardly facing exposed side of the tire, sometimes called the "curb side," so that tires were protected from curb, rock, brush, or Molotov cocktail damage. In a few cases a tire sidewall shield was placed on the brake side of tires, mainly to protect tire sidewalls from rock cuts or debris that may occur underneath a vehicle. However, there is a non-obvious need to protect the sidewalls that face each other when tires are arranged in a dual tire configuration. Dual tires are commonly used on tractor trailer trucks. Current design tire side shields cannot be placed between the dual tires because of clearance issues, so there is a need for a narrow device that can prevent debris from entering the area between the duals, expel such debris and/or shield one or both tires from damage from such debris.

The Dual Tire Shield of the invention is a structure that accomplishes the aforesaid purposes. The side walls of tires are much weaker than the treads. Unlike punctures to the treads, punctures to the sidewall render the tire irreparable. The sidewalls that face each other, or inside sidewalls, on dual tires have a unique problem in that debris can be wedged in between the tires. Small debris can cause damage when caught up in the gap between tires when the tires are rotating. The foreign matter or debris can repeatedly rub or impact the tire causing damage and abrasion. Such debris can also fly out at high speed causing damage to the vehicle, other vehicles, people and property. Of greater concern than smaller debris is larger debris, with large being defined as debris having at least one dimension close to the width of the gap between the dual tires. Debris of this type has the potential to become wedged between the tires, against the sidewall or even move farther inward toward the rims, and may be flung against the wheel assembly and tire as the vehicle moves. Wedged debris between dual tires can even unseat the beadseat of one of the tires and cause a flat.

The dual tire shield prevents large debris from getting stuck between the inner sidewalls of the dual tires and/or otherwise prevents flats caused by sidewall puncture or bead de-seating due to such debris. The device accomplishes its design goals in several ways. First, the dual tire shield can block debris from entering the gap between duals and prevent debris from being wedged in the gap. In this case, both dual tire sidewalls are protected. Second, the dual tire shield can cover the sidewalls. If debris does get stuck between the tires, it will be touching the tire shield rather than the tires. Third, if the debris gets stuck between one tire and the dual tire shield, then only one tire sidewall is subject to damage rather than both, reducing possible tire damage by 50%. Fourth, the dual tire shield can be designed to eject debris from between the tires to minimize damage. Fifth, the dual tire shield may be made rigid enough to act as a runflat in case a tire goes flat regardless of the reason.

Previous devices in the field of the invention were designed to protect the outermost sidewalls of tires, but not the sidewalls that face each other in a dual tire configuration. Examples are described in U.S. Publication No. 200910315389 (U.S. patent application Ser. No. 12/486,404), U.S. Publication No. 2010/0066155 (U.S. patent application Ser. No. 12/456,250), and PCT filing WO 2009/153666 publication dated Dec. 23, 2009 for PCT/IB2009/006341 filed Jun. 18, 2009.

SUMMARY AND OBJECTS

In view of the foregoing, it is an object of this invention to provide a tire shield between dual tires to protect the facing sidewalls from debris that may cut or damage the tire. In some embodiments of the invention, it is a further object to provide a runflat so that the vehicle can continue to operate for a limited distance in the event that either or both tires go flat for any reason (for example, a puncture through the tire tread).

The aforesaid objects are accomplished by the design of the shield of the invention, which mounts to the tire/wheel assembly. The design may include multiple embodiments and/or methods of preventing rocks or debris from getting stuck.

In addition to the benefits specified above, our invention provides several other benefits: (1) Since sidewall punctures are irreparable, the shield will pay for itself in terms of money saved from fewer tire replacements; (2) the solution can be permanently or semi-permanently attached between the dual tires, so there is no need to install or remove the device when going over different terrains; (3) the device is lightweight (it weighs less than two separate tire shields); (4) the material used in our device is already proven to be durable as it is already used on regular single-sided tire shields; and (5) wheel assemblies and most hub/stud/nut configurations do not need to be modified because the mounting disk is sufficiently thin.

BRIEF DESCRIPTION OF THE DRAWING FIGURES

FIG. 1 provides a schematic cross-sectional view of how an object can get pinched between the tire sidewalls in a dual wheel configuration.

Figure 2:
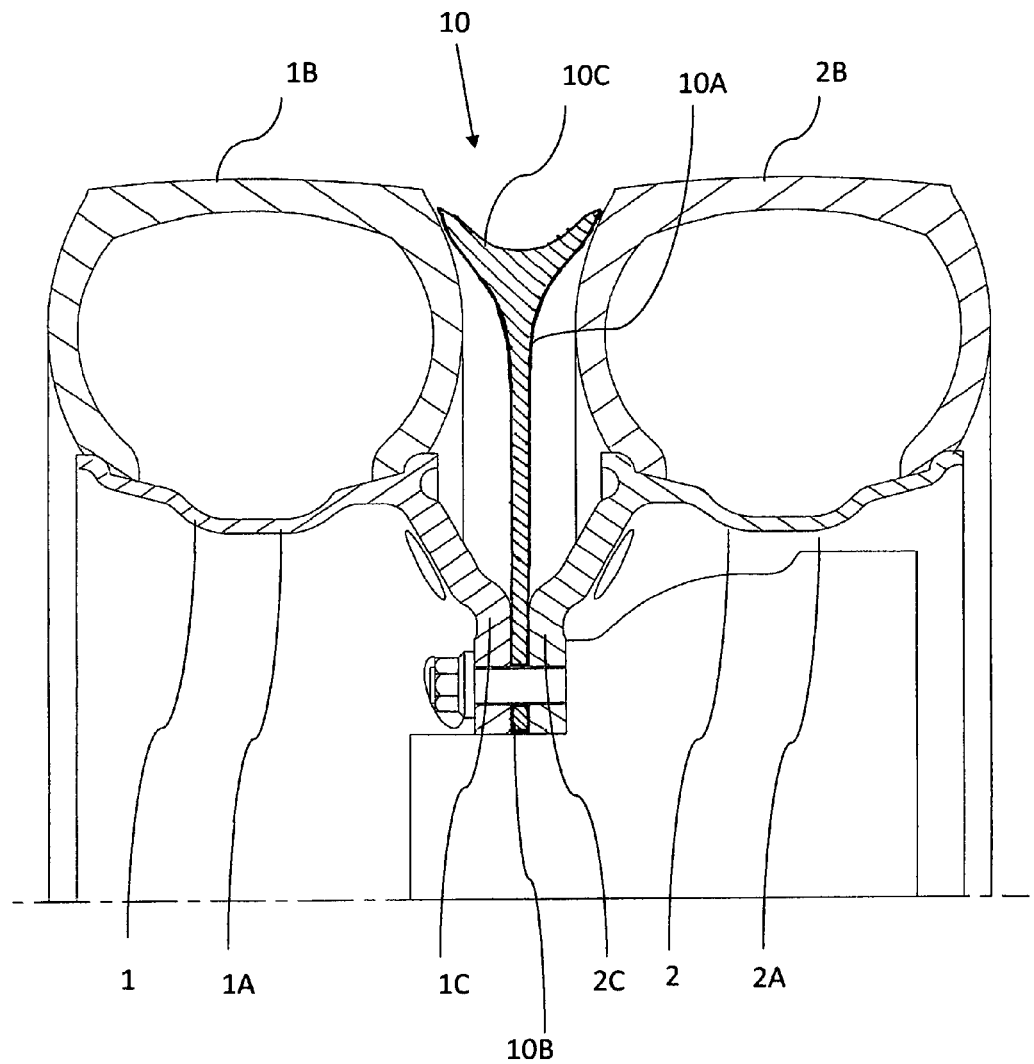

FIG. 2 provides a schematic cross-sectional view of a tire shield clamped between the wheels in a dual wheel configuration in accordance with our invention.

Figure 3:
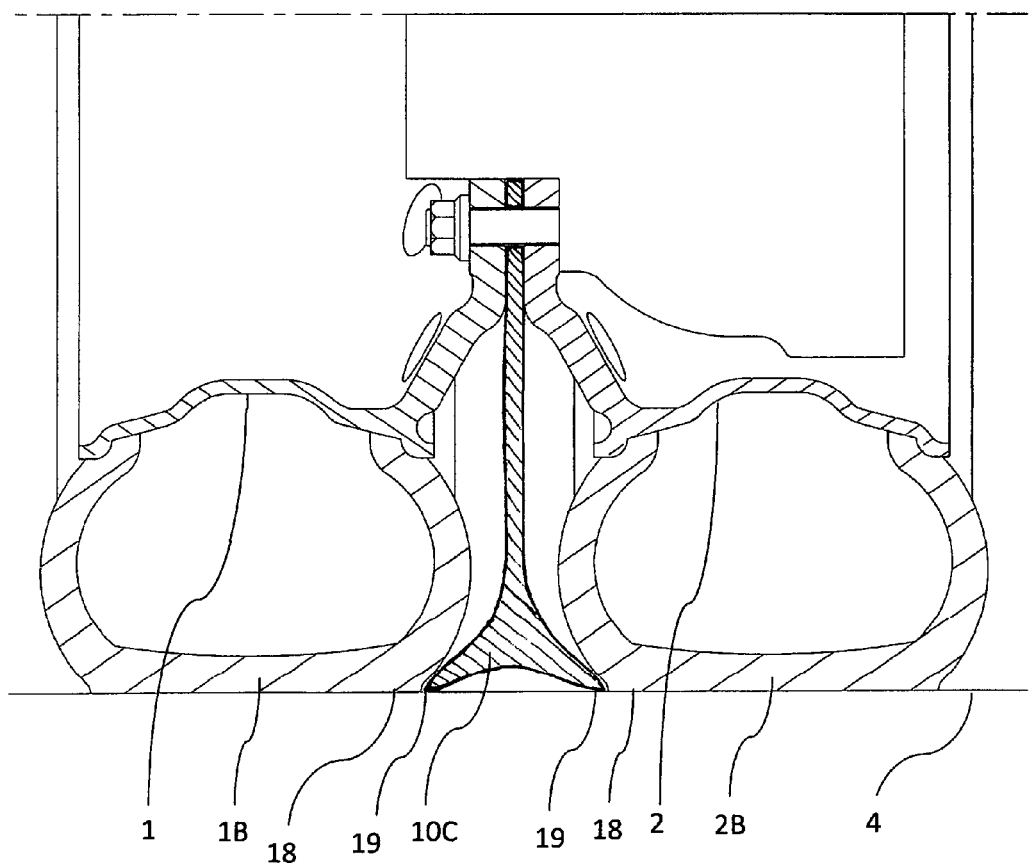

FIG. 3 provides a schematic cross-sectional view of the tire shield clamped between the wheels in a dual wheel configuration when at the ground contact position in accordance with our invention.

Figure 4:
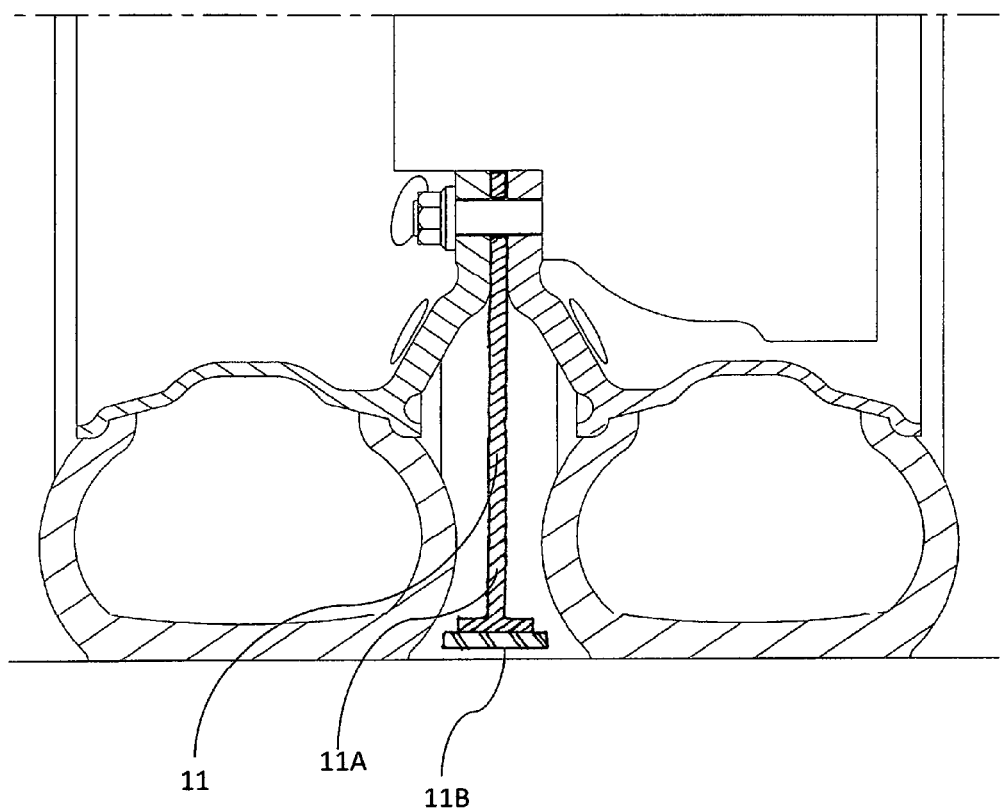

FIG. 4 provides a schematic cross-sectional view of a rigid frame work and a compliant outer ring for potential ground contact. In this embodiment the device, in accordance with our invention, can work as an auxiliary runflat if both tires fail.

Figure 5:
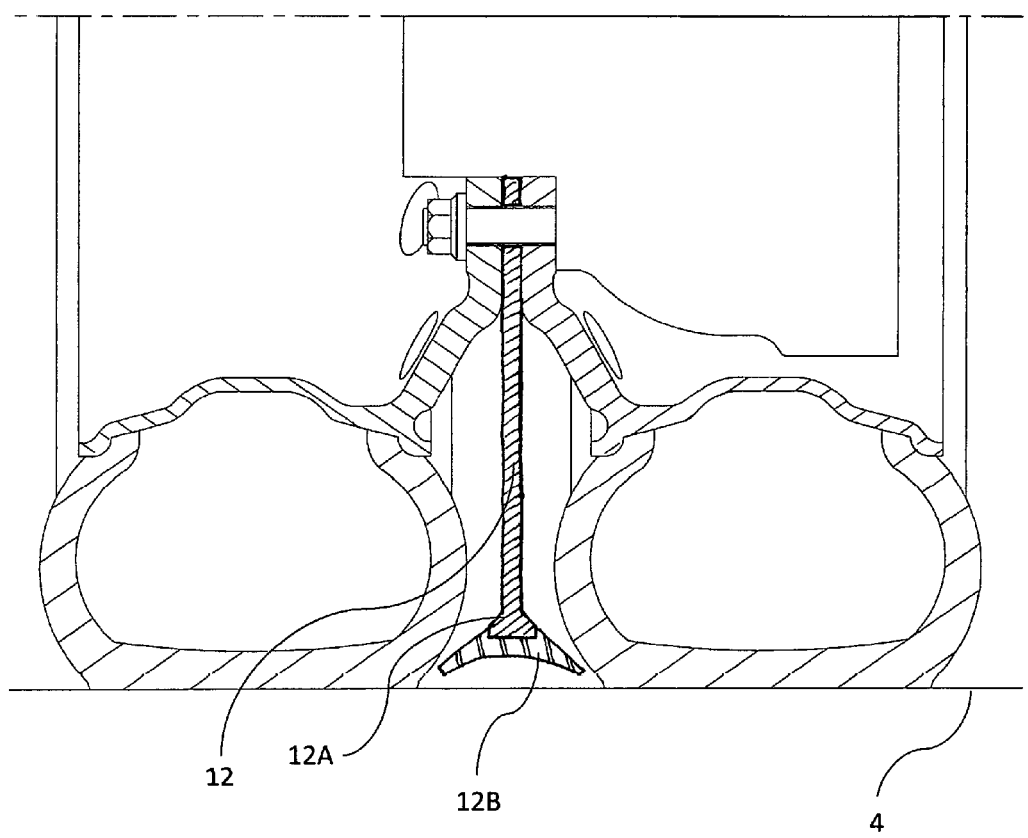

FIG. 5 provides a schematic cross-sectional view of a rigid frame work and a compliant outer ring for potential ground contact. In this embodiment the device, in accordance with our invention, can work as an auxiliary runflat if both tires were to fail and has a wider compliant band to better capture or prevent debris from getting in between tire and the rigid frame of the dual tire shield.

Figure 6:
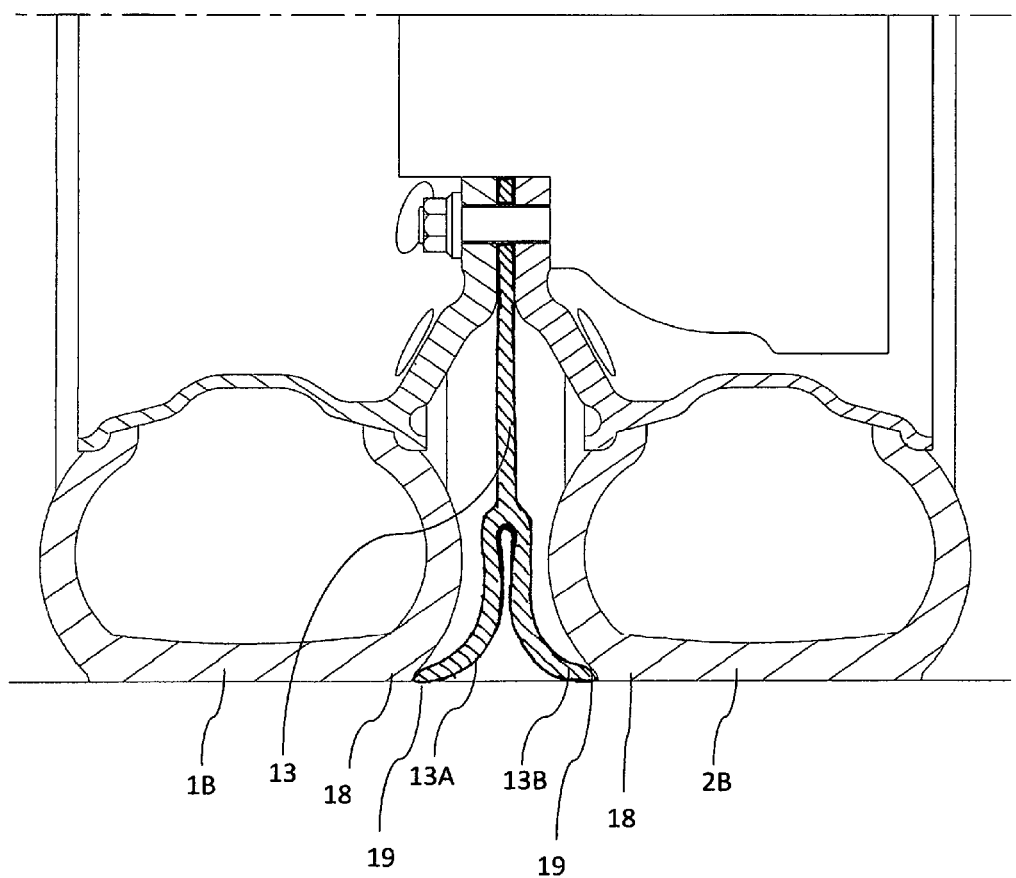

FIG. 6 provides a schematic cross-sectional view of a dual tire shield made with a compliant material in accordance with our invention.

Figure 7:
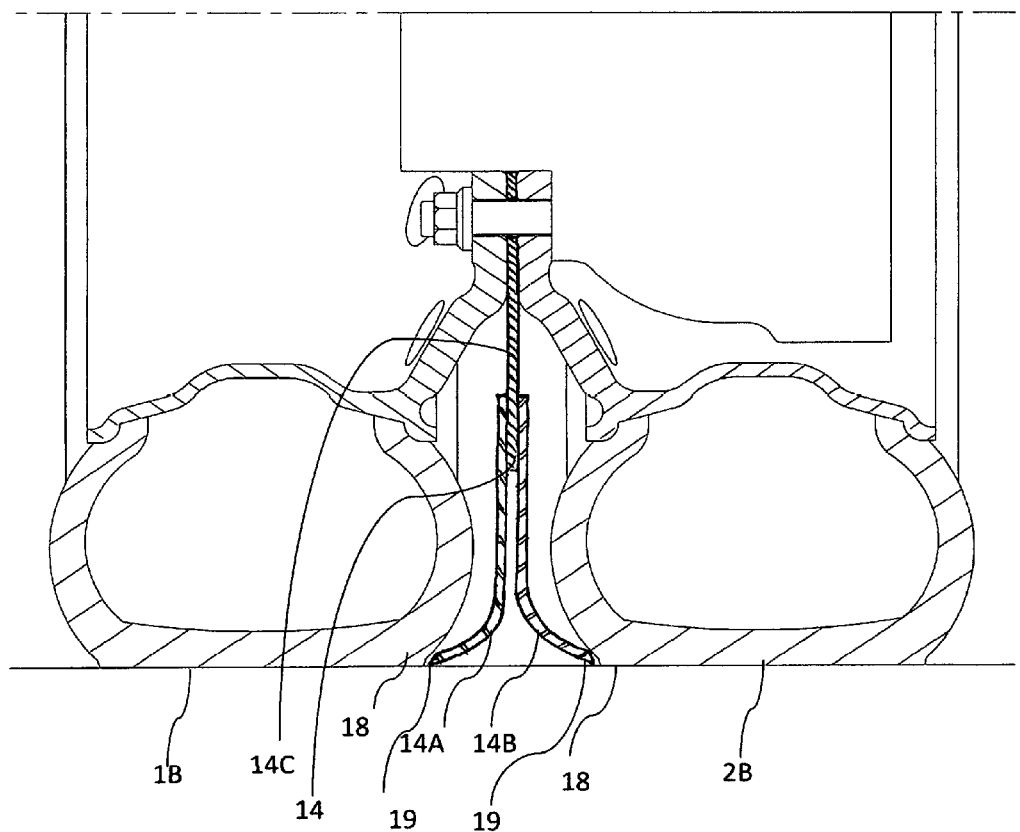

FIG. 7 provides a schematic cross-sectional view of a dual tire shield made with a rigid clamp disk with compliant shield halves attached in accordance with our invention.

Figure 8:
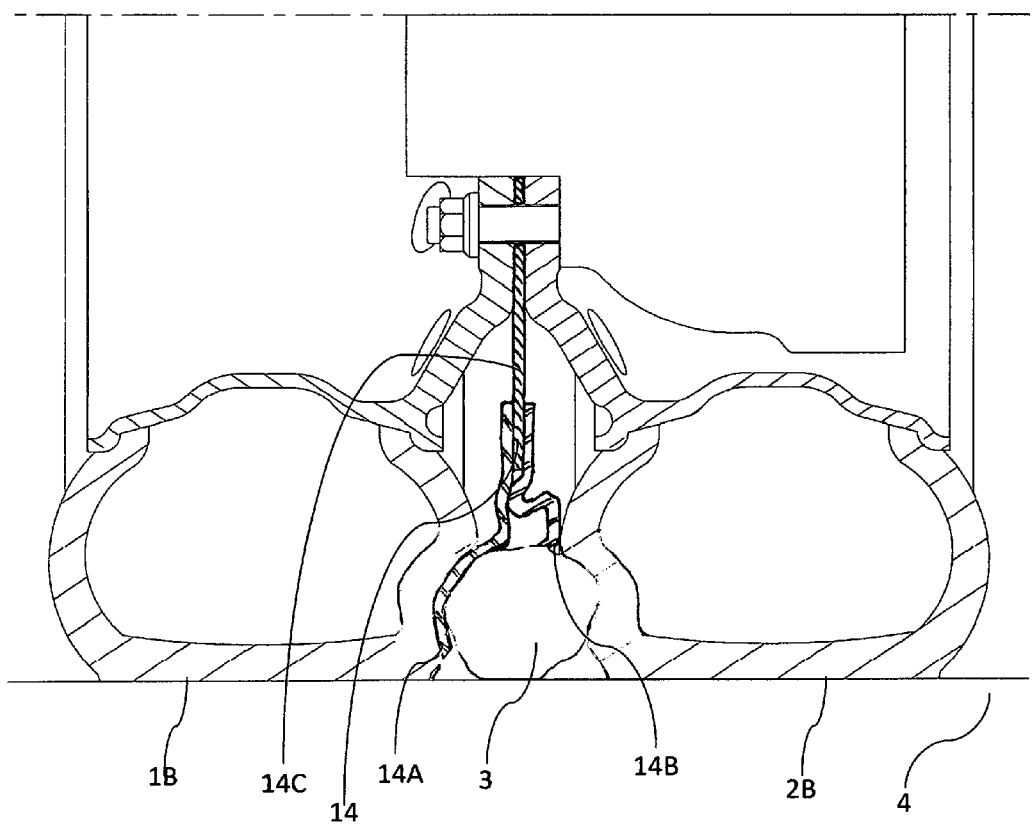

FIG. 8 provides a schematic cross-sectional view of a dual tire shield (as in FIG. 7) where a rock is pinched between the tire shield and one of the tires. In this situation one of the two tires is protected by the shield. For the inboard tire, the deflected shield is designed to push the object out as the assembly rotates away from the ground contact. The outboard shields also provide a lower friction surface (than the tire sidewall) to further facilitate the rock or to get it dislodged in accordance with our invention.

Figure 9:
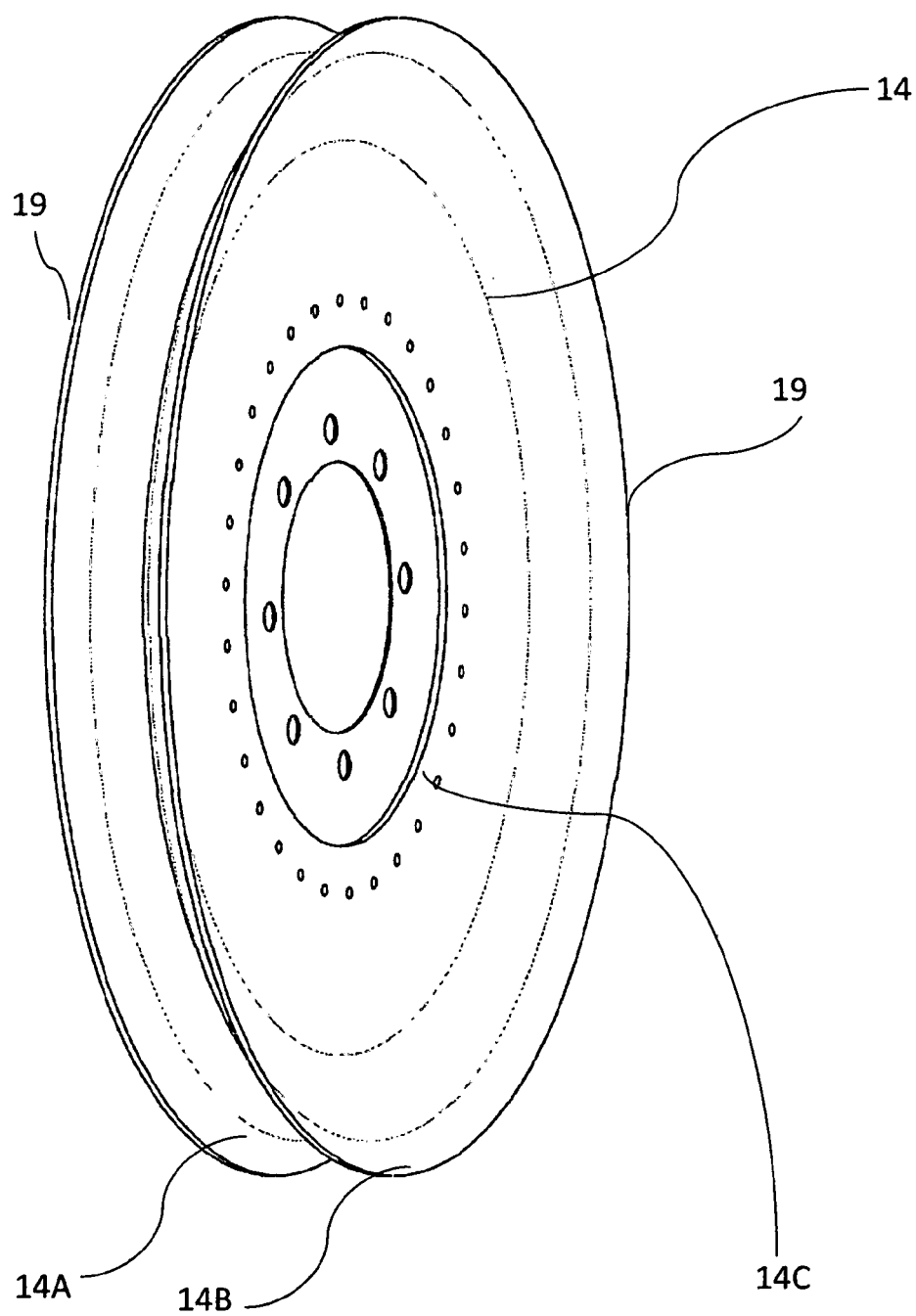

FIG. 9 provides a schematic perspective view of the dual tire shield shown in cross-sectional view in FIGS. 7 and 8.

Figure 10:
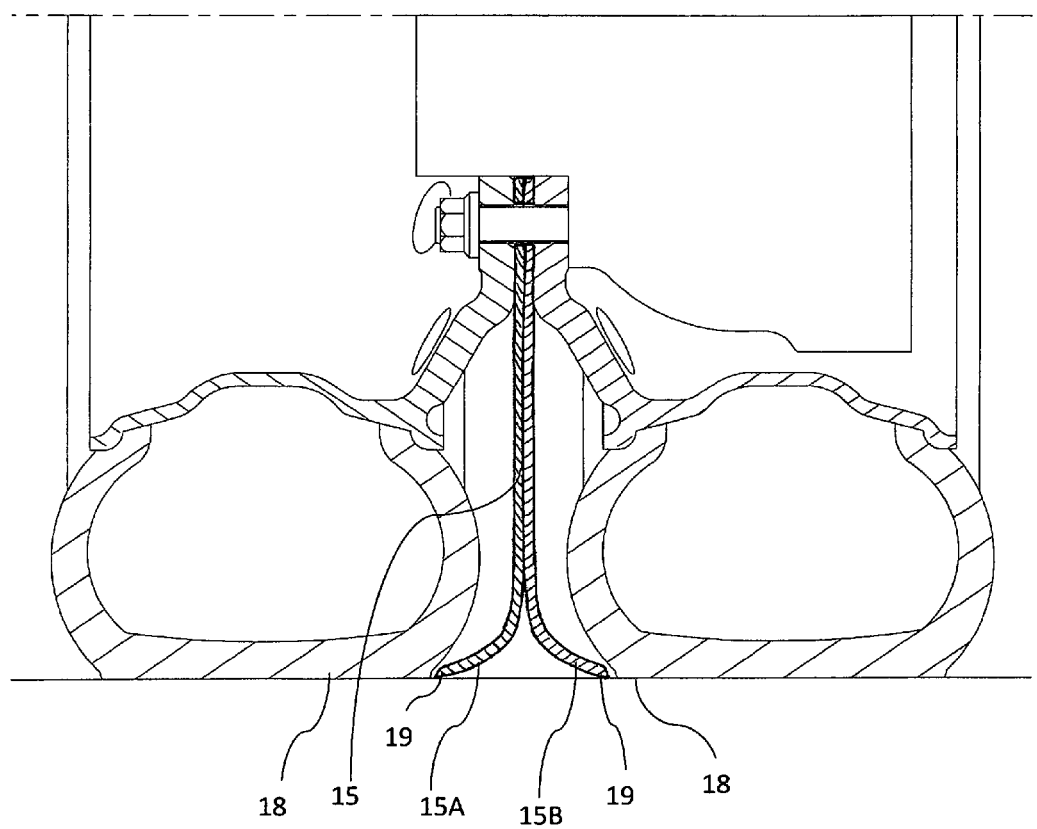

FIG. 10 provides a schematic cross-sectional view of an alternative embodiment of a dual tire shield. In this embodiment the dual tire shield is made up by two shield halves in accordance with our invention.

Figure 11:
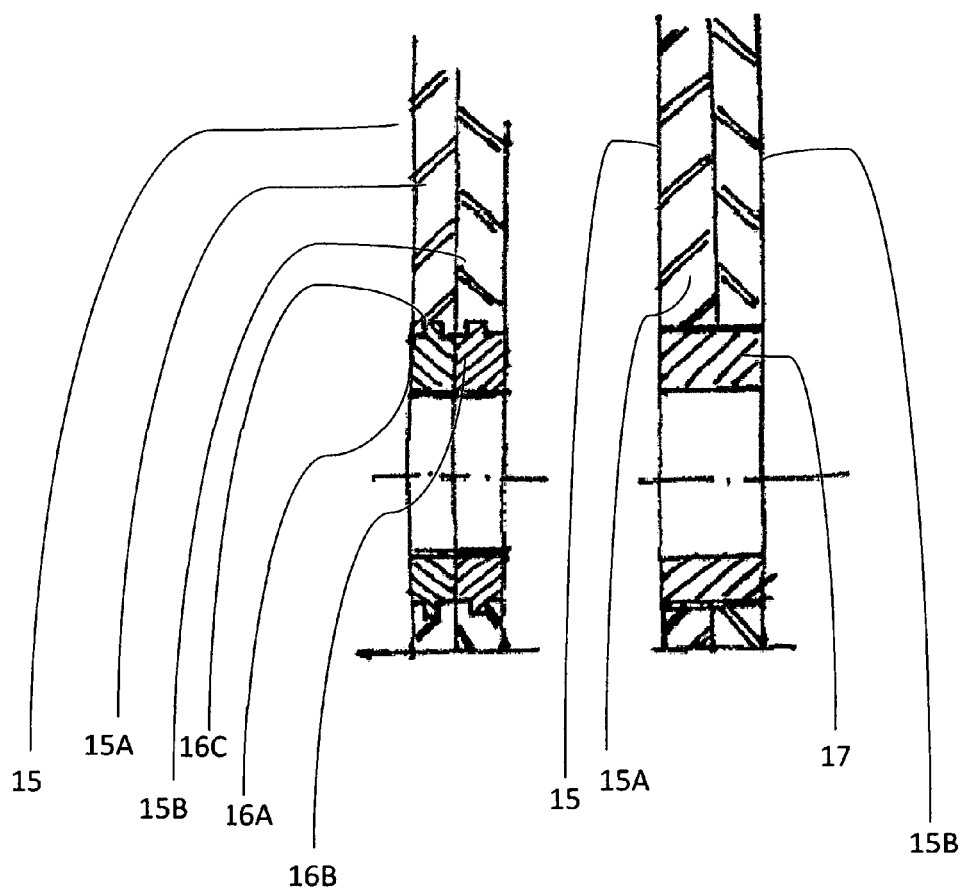

FIG. 11A provides a schematic detail cross-sectional view of how metal bushings in the disc portion can be over molded in each shield half in accordance with our invention.

FIG. 11B provides a schematic detail cross-sectional view of a metal bushing in an alternative embodiment in the disc portion of a dual tire shield in accordance with our invention.

DETAILED DESCRIPTION

The dual tire shield can be made from multiple parts or made as a single part. Materials used in the construction can be uniform homogeneous materials or composites. Rigid, semi-rigid, or compliant (i.e., resilient) materials may be used in the construction of the shield. Materials can be selected to give the runflat specific properties (such as strength, heat resistance, durability, fire resistance, flexibility, low friction, resiliency, or other special characteristics). Depending on the application, the shield can also perform the function of a runflat. The design, construction, and materials should be durable enough to last multiple trips so as to be cost effective.

As will be noted from the drawing figures and discussion, there are multiple possible embodiments and/or methods for preventing rocks and similar debris from entering between the tires, getting stuck in this position, protecting sidewalk from debris wedged between tires, and/or for expelling such rocks/debris from between the tires. FIG. 1 illustrates a rock (or other debris) 3 caught between the outer dual wheel assembly 1 and inner dual wheel assembly 2. The road surface is illustrated by Ground 4.

FIG. 2 illustrates the dual tire shield 10 located between the dual wheel assemblies 1 and 2. The major parts of each dual wheel assembly include the wheel (1A or 2A) and the tire (1B or 2B). The tire shield 10 is located between the wheel discs 1C and 2C as well as the tires 1B and 2B. The disc portion of the shield 10A can be solid or have material removed to decrease weight. The disc portion 10A can be relatively thin compared to the wheel discs 1C and 2C since the wheel discs 1C and 2C help to reinforce and rigidify the runflat disc 10A.

FIG. 3 illustrates the dual tire shield 10 between the dual wheel assemblies 1 and 2 at the ground 4 contact position. The shield 10 can be made from a non-rigid composite material designed not to interfere with the tire at any point during normal operation. The shield 10 can be designed to avoid contact with the ground 4, or the shield 10 can be designed to intentionally contact the ground 4 (as when the shield 10 is formed from sufficiently rigid materials and intended to act as runflat in the case where either tire 1B and/or tire 2B is flat). Throughout this specification, it should be understood that the term "runflat" can often be used instead of the term "shield" since the shield 10 can also act as a runflat in preferred embodiments.

FIG. 4 illustrates an alternative dual tire shield 11 design which is made in two parts. Shield 11 is composed of a shield disc 11A and shield tread 11B. Shield disc 11A may be made from a rigid material (such as aluminum, steel, carbon fiber, etc.) so that the shield 11 can support the vehicle weight if one or both of the tires go flat. In this state, the shield 11 can act as a run flat device. The shield tread 11B provides some cushioning, traction, and traditional functions similar to a treaded tire. The shield tread 11B is peripherally attached to the shield disc 11A. Its means of attachment to the shield disc 11A can be mechanical (i.e. bolts), chemical (i.e. adhesives), or it may be over-molded The shield tread 11B can be advantageously made from rubber, urethane or a variety of other plastic or rubber-like materials (but this does not bar its construction from a more rigid material).

Although FIG. 4 illustrates a "T" type design of the shield 11, it should be obvious to one of ordinary skill in the art that the shield 11 design can be a "Y" design as illustrated by shield 12 in FIG. 5, or that an "O," "U," "V," "Z," "7," or other cross sectional design (not shown) can be used as an alternative design configuration. FIG. 5 also shows that the shield tread 12B and shield disc 12A can be made wider on the periphery to reduce the contact pressure (load per unit of area) between the shield 12 and the ground 4 and to better block debris from getting between the tires. It should also be obvious to one of ordinary skill in the art that its shape can be asymmetric rather than symmetric (as shown).

FIG. 6 shows a compliant tire shield 13. Shield outer lip 13A and shield inner lip 13B can allow debris to be caught between the lips 13A and 13B rather than between the sidewalls of tires 1B and 2B. The lips 13A and 13B protect the tire sidewalls from damage, and in extreme cases, act as a sacrificial component in order to protect the tires.

FIG. 7 is an alternative embodiment of the tire shield shown in FIG. 6. In the FIG. 7 embodiment, the dual tire shield 14 consists of shield outer lip 14A, shield inner lip 14B, and shield disc 14C. The shield disc 14C is preferably made from rigid or semi-rigid material to prevent excessive "flopping" of the shield between the tires 1B and 2B. It should be obvious to one skilled in the art that the shield lips 14A and 14B can be attached to the shield 14C by a variety of mechanical, chemical, or molding means. FIG. 8 illustrates a rock 3 pinched between the shield outer lip 14A and inner tire 2B. Even if the rock 3 is not caught directly between the shield lips 14A and 14B, at least one of the tires (in this case tire 1B) is protected from sidewall damage. The shield lips 14A and 14B, being formed from compliant/resilient materials can act as a spring mechanism to automatically eject the rock 3 once the wheel assembly rotates away from the ground 4 contact. FIG. 9 shows the shield 14 illustrated in FIG. 7 and FIG. 8 in a perspective view.

FIG. 10 shows an alternative embodiment of the dual tire shield. In this embodiment shield 15 is composed of shield outer half 15A, and shield inner half 15B. This allows for more efficient manufacturing, better logistic economy (shields can be nested) and lower cost shield replacement if only one half of the shield is worn out or damaged. FIG. 11A provides further detail illustrating how bushings 16A and 16B can be used in shield halves 15A and 15B. Bushings 16A and 16B are rigid so that adequate clamping force is maintained in the dual wheel assembly (soft materials in a clamped assembly can take a compression set, reduce clamping force, and allow premature fastener fatigue or inadequate clamping forces). The over-mold interface 16C between the bushings (16A and 16B) and the shield halves (15A and 15B) can be any one of a variety of interface shapes and types; these are well-known to those of ordinary skill in the art. FIG. 11B shows an alternative bushing configuration. In this configuration, bushing 17 replaces bushing 16A and 16B that are shown in FIG. 11A. In this embodiment, the bushings 17 do not have to be molded in, but simply pressed in place. Another alternative embodiment (not shown) similar to the bushings illustrated in FIG. 11A and FIG. 11B is a center disc portion that replaces bushings at each hole. In this embodiment, shield halves 15A and 15B would surround the center disc portion that acts as a single bushing.

In any of these designs, the tire shield device can be quickly and easily attached and removed. The modular design makes part replacement easy and the shield mitigates tire damage from rock or debris. Replacement of a dual tire shield costs less that replacing an entire tire or tires. Finally, the following parts list for the drawing figures may be found to be of assistance in understanding more fully the concepts of our invention:

1 Outer dual wheel assembly
1A Outer wheel
1B Outer tire
1C Outer disc
2 Inner dual wheel assembly
2A Inner wheel
2B Inner tire
2C Inner disc
3 Rock (or other debris)
4 Ground
10 Dual tire shield (or runflat)
10A Disc portion of the shield
10B Attachment portion of the shield
10C Shield portion of the dual tire shield
11 Dual tire shield (or runflat)
11A Shield disc
11B Shield tread
12 Dual tire shield
12A Shield disc
12B Shield tread
13 Dual tire shield
13A Shield outer lip
13B Shield inner lip
14 Dual tire shield
14A Shield outer lip
14B Shield inner lip
14C Shield disc
15 Dual tire shield
15A Shield outer half
15B Shield inner half
16A Outer bushing
16B Inner bushing
16C Over-mold interface
17 Shield bushing
18 Tire treads
19 Shield tip In view of the foregoing, it should be clear that numerous changes and variations can be made without exceeding the scope of the inventive concept outlined. Accordingly, it is to be understood that the embodiments of the invention herein described are merely illustrative of the application of the principles of the invention. References to details of the illustrated embodiments are not intended to limit the scope of the invention claimed.

The invention claimed is:

1. A system for use with and protection of dual tires, where such tires include respective treads which contact the ground during rotation of said tires and facing sidewalls, and are mounted to a pair of circular wheel rims adapted for coaxial mounting to a vehicle hub, wherein each said wheel rim has formed coaxially on opposite ends thereof outwardly flaring circumferential flange sections disposed to be engaged by beads of tubeless tires mounted on said rim, wherein each said wheel rim has a disc section extending transversely of the axis of each of said rims by which said wheel rim is mounted to the vehicle hub, and wherein said disc sections are adjacent and parallel when mounted to said vehicle hub, comprising:
 an attachment portion by which said system is affixed intermediate said tires by attachment to the vehicle hub intermediate said disc sections;
 a tire shield portion depending from said attachment portion, said tire shield portion formed with inner and outer lips proximate said respective facing sidewalls of said tires, which lips extend laterally away from said attachment portion such that tips of said lips lie adjacent said respective treads of said tires so as to block debris from entering between said respective sidewalls of said tires, shield said respective sidewalls from contact with said debris, and expel debris that does enter between said respective sidewalls.

2. The system of claim 1, wherein distance between said attachment portion and the tips of said lips is such that said tips are adjacent said treads and ground when said treads are in contact with the ground and more distant therefrom when said treads are not in contact with the ground.

3. The system of claim 2, wherein said tire shield portion is formed from resilient materials such that if it runs over ground debris that force its compression or deformation it will return to its normal shape when rotated away from the ground so as to expel said debris from between said tire walls.

4. The system of claim 3, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

5. The system of claim 2, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

6. The system of claim 1, wherein said tire shield portion is formed from resilient materials such that if it runs over ground debris that force its compression or deformation it will return to its normal shape when rotated away from the ground so as to expel said debris from between said tire walls.

7. The system of claim 6, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

8. The system of claim 1, wherein at least one of said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

9. A system for use with and protection of dual tires, comprising:
 a pair of circular wheel rims adapted for coaxial mounting to a vehicle hub, wherein each said wheel rim has formed coaxially on opposite ends thereof outwardly flaring circumferential flange sections disposed to be engaged by beads of tubeless tires mounted on said rim, wherein each said tire includes respective treads which contact the ground during rotations of said tires and facing sidewalls, wherein each said wheel rim has a disc section extending transversely of the axis of each of said rims by which said wheel rim is mounted to the vehicle hub, and wherein said disc sections are adjacent and parallel when mounted to said vehicle hub; and
 a tire shield apparatus, comprising:
  an attachment portion by which said system is affixed intermediate said tires by attachment to the vehicle hub intermediate said disc sections;
  a tire shield portion depending from said attachment portion, said tire shield portion formed with inner and outer lips proximate said respective facing sidewalls of said tires, which lips extend laterally away from said attachment portion such that tips of said lips lie adjacent said respective treads of said tires so as to block debris from entering between said respective sidewalls of said tires, shield said respective sidewalls from contact with said debris, and expel debris that does enter between said respective sidewalls.

10. The system of claim 9, wherein distance between said attachment portion and the tips of said lips is such that said tips are adjacent said treads and ground when said treads are in contact with the ground and more distant therefrom when said treads are not in contact with the ground.

11. The system of claim 10, wherein said tire shield portion is formed from resilient materials such that if it runs over ground debris that force its compression or deformation it will return to its normal shape when rotated away from the ground so as to expel said debris from between said tire walls.

12. The system of claim 11, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

13. The system of claim 10, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

14. The system of claim 9, wherein said tire shield portion is formed from resilient materials such that if it runs over ground debris that force its compression or deformation it will return to its normal shape when rotated away from the ground so as to expel said debris from between said tire walls.

15. The system of claim 14, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

16. The system of claim 9, wherein at least one of: said tire shield portion depends from said attachment portion via a rigid disc portion, said attachment portion includes rigid bushings, said system includes a runflat portion, said system includes a runflat portion depending from said attachment portion intermediate said tires, said system includes a runflat portion including a rigid disc portion depending from said attachment portion intermediate said rims, and said tire shield portion also serves as a runflat.

* * * * *